(12) United States Patent
Eisenstadt et al.

(10) Patent No.: US 12,530,533 B2
(45) Date of Patent: Jan. 20, 2026

(54) TEXT COHERENCE CLASSIFIER

(71) Applicant: Microsoft Technology Licensing, LLC, Redmond, WA (US)

(72) Inventors: Roy Eisenstadt, Be'er Sheva (IL); Abedelkader Asi, Kfar Bara (IL); Royi Ronen, Tel Aviv (IL); Dean Geckt, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 17/741,694

(22) Filed: May 11, 2022

(65) Prior Publication Data

US 2023/0367968 A1    Nov. 16, 2023

(51) Int. Cl.
*G06F 40/30* (2020.01)
*G06F 40/216* (2020.01)
*G06F 40/253* (2020.01)
*G06N 20/00* (2019.01)

(52) U.S. Cl.
CPC ............ *G06F 40/30* (2020.01); *G06F 40/216* (2020.01); *G06F 40/253* (2020.01); *G06N 20/00* (2019.01)

(58) Field of Classification Search
CPC ...... G06F 40/30; G06F 40/253; G06F 40/216; G06N 20/00
See application file for complete search history.

(56) References Cited

U.S. PATENT DOCUMENTS

| | | | | |
|---|---|---|---|---|
| 5,828,999 | A * | 10/1998 | Bellegarda | G06V 30/274 704/E15.024 |
| 5,839,106 | A * | 11/1998 | Bellegarda | G10L 15/1815 704/E15.024 |
| 9,075,774 | B2 * | 7/2015 | Saikou | G06F 40/10 |
| 10,572,598 | B2 * | 2/2020 | Chakraborty | G06N 3/044 |

(Continued)

FOREIGN PATENT DOCUMENTS

| | | |
|---|---|---|
| CN | 113821635 A | 12/2021 |
| WO | 2021217987 A1 | 11/2021 |

OTHER PUBLICATIONS

Asi, Abedelkadir, Song Wang, Roy Eisenstadt, Dean Geckt, Yarin Kuper, Yi Mao, and Royi Ronen, "An End-to-End Dialogue Summarization System for Sales Calls", Apr. 28, 2022, arXiv preprint arXiv:2204.12951. (Year: 2022).*

(Continued)

*Primary Examiner* — Daniel C Washburn
*Assistant Examiner* — James Boggs
(74) *Attorney, Agent, or Firm* — Holzer Patel Drennan (57) ABSTRACT

Text coherence is classified by receiving a multiword text string into a machine learning model, determining, by the machine learning model, semantic probability data representing a probability that a word of the received multiword text string is semantically correlated to one or more other words in the multiword text string, determining, by the machine learning model, an inferential aggregate perplexity score of the multiword text string, based on the determined semantic probability data, outputting, from the machine learning model, the inferential aggregate perplexity score, and classifying a coherence of the multiword text string based on whether the outputted inferential aggregate perplexity score satisfies a coherence condition, wherein the coherence condition is based on a predefined coherence score.

21 Claims, 5 Drawing Sheets

(56) References Cited

U.S. PATENT DOCUMENTS

| | | | | |
|---|---|---|---|---|
| 10,628,474 | B2* | 4/2020 | Modani | G06F 40/30 |
| 10,885,436 | B1* | 1/2021 | Saleh | G06N 3/08 |
| 11,095,468 | B1* | 8/2021 | Pandey | H04L 12/1831 |
| 11,144,729 | B2* | 10/2021 | Iwakura | G06N 20/00 |
| 11,423,114 | B2* | 8/2022 | Narth | G06F 40/30 |
| 11,461,549 | B2* | 10/2022 | Zhang | G06F 40/30 |
| 11,847,424 | B1* | 12/2023 | Harkous | G06F 40/56 |
| 11,908,477 | B2* | 2/2024 | Embar | G06F 40/205 |
| 2013/0185074 | A1 | 7/2013 | Gruber et al. | |
| 2021/0042391 | A1 | 2/2021 | Gehrmann et al. | |
| 2022/0101835 | A1 | 3/2022 | Freed et al. | |

OTHER PUBLICATIONS

Shafieibavani, Elaheh, Mohammad Ebrahimi, Raymond K. Wong, and Fang Chen, "An Efficient Approach for Multi-Sentence Compression", Nov. 2016, Asian Conference on Machine Learning, Proceedings of Machine Learning Research, vol. 63, pp. 414-429. (Year: 2016).*

Biswas, Pratik K., and Aleksandr Iakubovich, "Extractive Summarization of Call Transcripts", Apr. 2021, arXiv preprint arXiv: 2103.10599. (Year: 2021).*

Marchenko, O. O., O. S. Radyvonenko, T. S. Ignatova, P. V. Titarchuk, and D. V. Zhelezniakov, "Improving Text Generation Through Introducing Coherence Metrics", Jan. 2020, Cybernetics and Systems Analysis, vol. 56, No. 1, pp. 13-21. (Year: 2020).*

Bao, Mengjiao, Jianxin Li, Jian Zhang, Hao Peng, and Xudong Liu, "Learning Semantic Coherence for Machine Generated Spam Text Detection", Jul. 2019, 2019 International Joint Conference on Neural Networks (IJCNN), pp. 1-8. (Year: 2019).*

Shafieibavani, Elaheh, "Toward Abstractive Text Summarization", Jan. 2019, Doctoral dissertation, The University of New South Wales Sydney. (Year: 2019).*

Palma, Diego, and John Atkinson, "Coherence-Based Automatic Essay Assessment", Sep. 2018, IEEE Intelligent Systems vol. 33, No. 5, pp. 26 36. (Year: 2018).*

Chen, Yulong, Yang Liu, Liang Chen, and Yue Zhang, "DialogSum: A Real-Life Scenario Dialogue Summarization Dataset", Aug. 2021, Findings of the Association for Computational Linguistics: ACL-IJCNLP 2021, pp. 5062-5074. (Year: 2021).*

Lehmann, Christian, "The nature of parts of speech", Sep. 2013, STUF: Language Typology & Universals, vol. 66, No. 2, pp. 141-177. (Year: 2013).*

Pascual, Damián, Béni Egressy, Clara Meister, Ryan Cotterell, and Roger Wattenhofer, "A Plug-and-Play Method for Controlled Text Generation", Nov. 2021, Findings of the Association for Computational Linguistics: EMNLP 2021, pp. 3973-3997. (Year: 2021).*

Gârbacea, Cristina, and Qiaozhu Mei, "Neural Language Generation: Formulation, Methods, and Evaluation", Jul. 2020, arXiv preprint arXiv:2007.15780. (Year: 2020).*

Harispe, Sébastien, Sylvie Ranwez, Stefan Janaqi, and Jacky Montmain, "Semantic Similarity from Natural Language and Ontology analysis preprint", Apr. 2017, arXiv preprint arXiv:1704.05295. (Year: 2017).*

Yuan, Weizhe, Graham Neubig, and Pengfei Liu, "BARTSCORE: Evaluating Generated Text as Text Generation", Sep. 2021, Proceedings of the 35th International Conference on Neural Information Processing Systems (NeurIPS 2021). (Year: 2021).*

Liu, et al., "Harvesting and Summarizing User-Generated Content for Advanced Speech-Based HCI", In Journal of Selected Topics in Signal Processing, vol. 6, Issue 8, Dec. 2012, pp. 982-992.

Rezazadegan, et al., "Automatic Speech Summarisation: A Scoping Review", In Repository of arXiv:2008.11897, Aug. 27, 2020, 21 Pages.

Asi, et al., "An End-to-End Dialogue Summarization System for Sales Calls", In Repository of arXiv:2204.12951v2, Apr. 28, 2022, 9 Pages.

Gu, et al., "Perception Score: A Learned Metric for Open-ended Text Generation Evaluation", In Proceedings of the 35th AAAI Conference on Artificial Intelligence, May 18, 2021, pp. 12902-12910.

Martinc, et al., "Supervised and Unsupervised Neural Approaches to Text Readability", In Journal of Computational Linguistics, vol. 47, Issue 1, Apr. 21, 2021, pp. 141-179.

"International Search Report and Written Opinion Issued in PCT Application No. PCT/US23/013373", Mailed Date: May 15, 2023, 11 Pages.

* cited by examiner

TEXT COHERENCE CLASSIFIER

BACKGROUND

Computing systems can record and transcribe conversations. Computing systems can further generate summaries using inferential models such as machine learning models. The summaries may include computer-generated multiword text strings. Some of the computer-generated multiword text strings may be more coherent than others.

SUMMARY

The described technology classifies text coherence by receiving a multiword text string into a machine learning model, determining, by the machine learning model, semantic probability data representing a probability that a word of the received multiword text string is semantically correlated to one or more other words in the multiword text string, determining, by the machine learning model, an inferential aggregate perplexity score of the multiword text string, based on the determined semantic probability data, outputting, from the machine learning model, the inferential aggregate perplexity score, and classifying a coherence of the multiword text string based on whether the outputted inferential aggregate perplexity score satisfies a coherence condition, wherein the coherence condition is based on a predefined coherence score.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Inferential models such as machine learning models can generate summaries of transcribed conversations. The summaries may include a collection of computer-generated multiword text strings. While machine learning algorithms can generate multiword text strings that closely summarize transcribed conversation points, the machine learning algorithms often produce multiword strings of text with errors. Examples of errors include grammatical errors, misidentification of words carried over from the transcript, word repetitions, content that is undesirable, or otherwise incoherent content. The errors may be time-consuming to correct and may discourage an operator from using the automated summarizations.

The presently disclosed technology provides a coherence classification system that takes as input multiword text strings and classifies the coherence of the multiword text strings based on a determined perplexity of the multiword text strings. In implementations, the system includes a machine learning model to determine a probability that a word in a multiword text string is semantically related to other words in the multiword text string. For example, a probability can be determined that the word semantically belongs in the multiword text string relative to previous words in the text string. Probability data for one or more of the words in the multiword text string are determined and then entered into a perplexity model. The machine learning model then determines and outputs an aggregate perplexity score representing the perplexity of the multiword text string based on the probability data.

A coherence classifier that may but need not be an element of the machine learning model receives the outputted aggregate perplexity score. The coherence classifier classifies the coherence of the multiword text string based on the aggregate perplexity score. For example, the coherence classifier may classify the multiword text string based on whether the outputted inferential aggregate perplexity score satisfies a coherence condition. In implementations, the coherence condition is based on a predefined coherence score.

In implementations, the machine learning model is trained to determine the perplexity. The training may include inputting a training text string semantically representing the text of a recorded conversation. The machine learning model in training may output a training aggregate perplexity score. The training aggregate perplexity score may then be compared with a predefined target aggregate perplexity score. In implementations, the training data may include coherent, moderately coherent, and incoherent multiword strings of text with associated labels as aggregate perplexity scores. Higher aggregate perplexity scores may be indicative of high perplexity and, accordingly, low coherence. For example, a perfectly multiword text string may be labeled with a low target aggregate perplexity score. A moderately coherent multiword text string may be labeled with a moderate target aggregate perplexity score (e.g., a score between zero and one and a zero to one scale). An incoherent multiword text string may be labeled with a high target aggregate perplexity score (e.g., an aggregate perplexity score of one or close to one).

In implementations, a training text string semantically representing the text of a recorded conversation is input into the machine learning model. The machine learning model may output a training aggregate perplexity score based on the input. The machine learning model may compare the training aggregate perplexity score with a predefined aggregate perplexity score to determine a loss and backpropagate the determined loss through the machine learning model.

The described technology may be used to classify computer-generated strings in many applications, including document summarization, speech-to-text conversion, proofreading, optical character recognition (OCR), and other text-based applications. For example, in summarizing a text document or transcript, the described technology can be used to select the most linguistically, grammatically, and/or semantically coherent alternative summarization and/or highlight summarizations that could benefit from human revision. In another example, the described technology can be used to select the most coherent OCR or speech-to-text conversions or highlight those conversions that should be reviewed.

Figure 1:
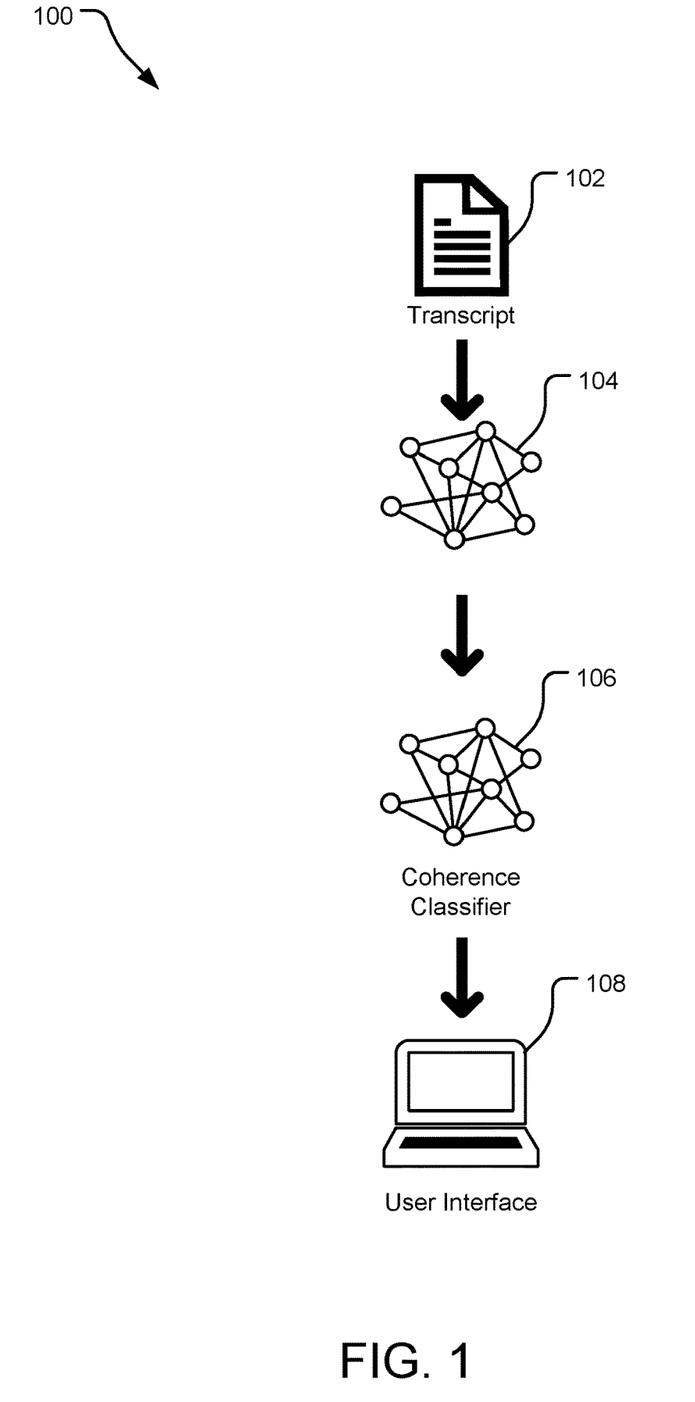
FIG. 1 illustrates an example system for classifying the coherence of a multiword text string.

FIG. 1 illustrates an example system 100 for classifying the coherence of a multiword text string. In implementations of system 100, a transcript 102 is provided for determining whether the text in the transcript is coherent. The transcript 102 may include a textual representation of a conversation (e.g., a text or audio conversation between users). The transcript may also include the roles of the users from the conversation (e.g., a user who is an agent and a different user who is a client).

In implementations, the transcript 102 is introduced to a summary generator 104. A summary generator 104 is operable to semantically interpret the text strings of the transcript and output multiword computer-generated text strings that represent summary highlights from the transcript 102. The output summary highlights may be different from and semantically represent one or more portions of the transcript 102. The summary generator 104 may include a machine learning model. The machine learning model may be trained with predefined summary highlights as targets, so many of the output multiword computer-generated text strings will be as coherent as the target predefined summary highlights from training. However, the machine learning model of the summary generator 104 often makes errors and yields moderately or completely incoherent statements.

In order to ensure that text generated by a computer is coherent, the system 100 may utilize a coherence classifier 106. In implementations, the coherence classifier 106 receives a multiword text string. The coherence classifier includes or receives output of a machine learning model that outputs an aggregate perplexity score from the input multiword text string. The machine learning model internally outputs individual probabilities for each word in the string, the probability data representing semantic relevance of each word in the string. The machine learning model then provides the individual probabilities of the words to a perplexity generator that generates an aggregate perplexity score for the multiword text string. The machine learning model outputs an aggregate perplexity score which is received in the coherence classifier 106. The coherence classifier 106 classifies the multiword text string based on whether the outputted aggregate perplexity score satisfies a coherence condition.

In the illustrated implementation, the transcript 102 is introduced to the machine learning model of the coherence classifier 106. The machine learning model receives the transcript as input, parses the transcript into multiword strings, inputs the multiword strings (e.g., with roles of the users generating the multiword string), determines semantic probability data (e.g., by executing a probability generator) representing probabilities that each word semantically belongs with other words (e.g., previous words) in the multiword strings, introduces the probability scores to a perplexity generator, generates an aggregate perplexity score by the perplexity generator and then outputs the aggregate perplexity score from the machine learning model.

The coherence classifier 106 receives the aggregate perplexity scores and associated multiword strings and classifies the coherence of the multiword strings based on the associated aggregate perplexity scores. The coherence classifier 106 classifies the multiword text string based on whether the output aggregate perplexity score satisfies a coherence condition. The coherence condition may include a coherence score. A coherence score can represent one or more of a threshold perplexity score for filtering, a range of values of perplexity scores for filtering, and a relative ranking of perplexity scores for different multiword text strings in a single document (e.g., the transcript 102). Although the machine learning model is introduced here as an element of the illustrated coherence classifier 106, in alternative implementations, the machine learning model is an entity separate from the coherence classifier 106 that feeds perplexity scores to the coherence classifier 106.

The machine learning model may be trained on data that is specific to the context for which coherence is to be determined. For example, the machine learning model may be trained on statements specific to a sales context such that the coherence will be focused in the realm of sales with jargon that may lack coherence in a different context. While the illustrated implementation uses a transcript 102 as input, it should be appreciated that the coherence classifier 106 can determine the coherence of any multiword text string. The machine learning model can be trained to output perplexity scores for specific contexts to produce better perplexity scores.

When the coherence classifier 106 has determined whether the output perplexity scores satisfy coherence conditions, the coherence classifier 106 may determine which of the multiword text strings should be transferred for a display to a user interface 108 based on the satisfaction. For example, if a multiword text string is determined to be coherent for having a perplexity score that is greater than a minimum threshold coherence score, the coherence classifier 106 may transmit the multiword text string to the user interface 108 for display.

The user interface 108 may display the multiword text string or an associated selectable item to be selected by a user for inclusion in a summary of the transcript 102. In implementations, the coherence condition may include a classifier that a statement is moderately coherent but could be modified to be more coherent. For example, if a multiword text string is associated with an aggregate perplexity score that falls within a range of coherence scores predefined to be moderately coherent, the user interface 108 could display a suggestion associated with the selectable item and/or multiword text string that the multiword text string may benefit from editing by a user to increase the coherence of the multiword text string. In implementations in which the user interface 108 displays a selectable item, the selectable item may be displayed in a first portion of a user interface and, upon selection by a user, be displayed in a second portion of the user interface 108. In implementations, the selection may cause the removal of the selectable item from the first portion. In implementations, the first portion and the second portion are concurrently displayed (e.g., in a same window).

In implementations, the machine learning model associated with the coherence classifier 106 may be a trained machine learning model trained by a machine learning model trainer introducing training multiword text strings semantically representing the text of a recorded conversation. The machine learning model may then output a training aggregate perplexity score for each training text string. The machine learning model trainer may then compare the training aggregate perplexity score with a predefined aggregate perplexity score to determine a loss. The machine learning model trainer may then backpropagate the determined loss through the machine learning model.

Figure 2:
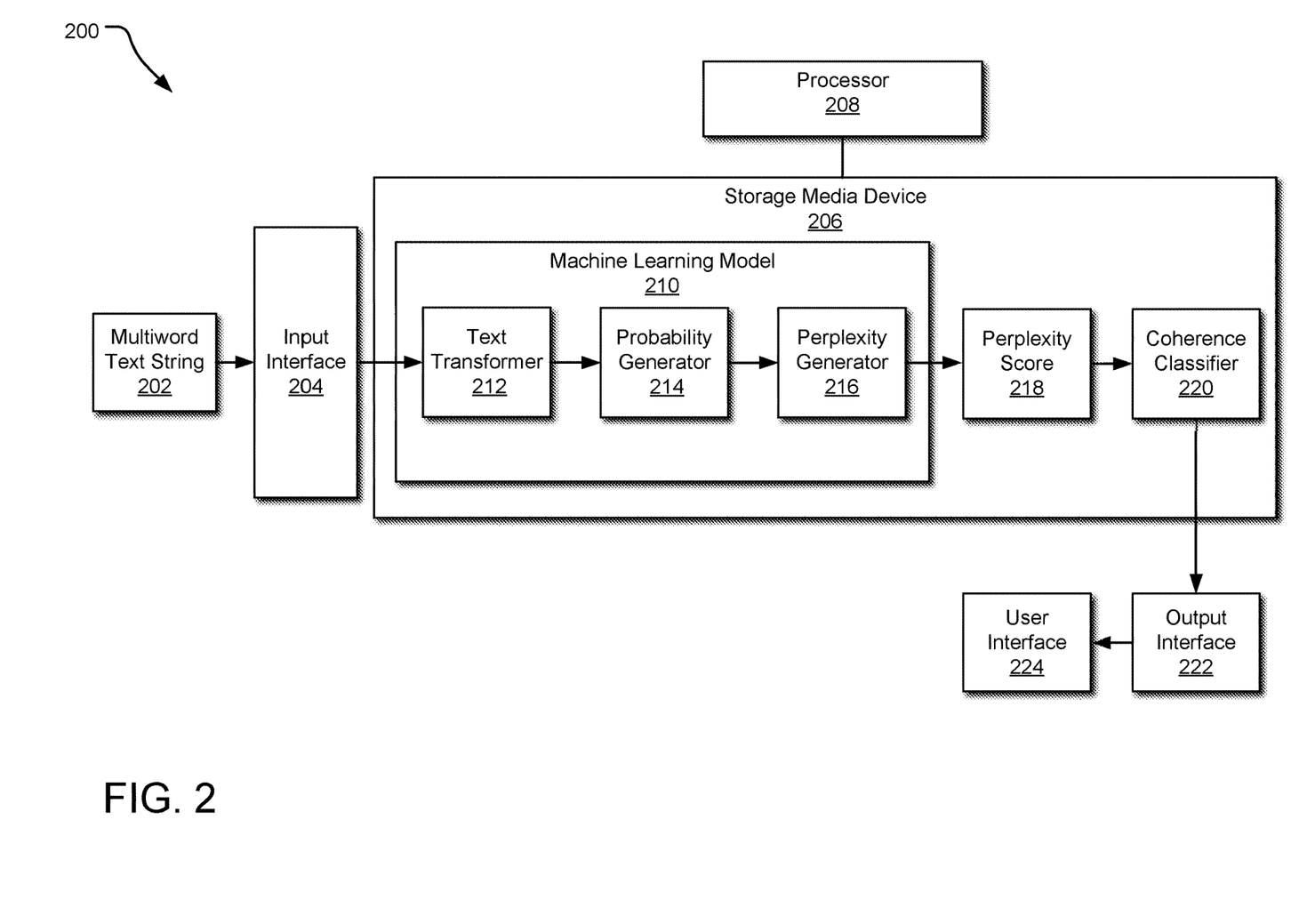
FIG. 2 illustrates another example system for classifying the coherence of a multiword text string.

FIG. 2 illustrates another example system 200 for classifying the coherence of a multiword text string 202. The system may include a storage media device 206 with elements executable by a processor 208 in communication with the storage media device 206. In implementations, the multiword text string 202 includes text semantically representing a portion of a transcript of a conversation. A system (e.g., an operating system and/or summary generator) inputs the multiword text string 202 into the machine learning model 210 via an input interface 204.

In implementations, the machine learning model 210 includes a text transformer 212. The text transformer 212 is executable by the processor 208 and operable to transform the text of the multiword text string 202 to be digestible by the elements of the machine learning model 210. For example, the text transformer 212 may be operable to tokenize or otherwise encode the multiword text string 202. The text transformer 212 may output the encoded representation of the multiword text string 202.

The machine learning model 210 may provide the encoded representation of the multiword text string 202 as input to a probability generator 214 of the machine learning model 210. The probability generator 214 is executable by the processor 208 and is operable to generate semantic probability data representing a probability that a word (represented as an encoding) of the multiword text string 202 is semantically correlated to one or more other words in the multiword text string 202. For example, the probability data for each word could include a probability that a word would be the next word in a string based on preceding words in the multiword text string 202. The output of the probability generator 214 may include semantic probability data representing one or more semantic probabilities of words in the multiword text string 202. In an implementation, the probability generator 214 generates semantic probability data for each of the words in the multiword text string 202 and may additionally or alternatively include probability data representing a probability of a punctuation mark in the encoding of the multiword text string 202.

In implementations, probability generator 214 normalizes the probability data for each word relative to other words identified in the lexicon of the machine learning model 210. For example, the probability may determine the probabilities of many words based on other words in the multiword text string 202. In implementations, the probability generator 214 calculates probabilities are calculated for all words (or tokenized or encoded versions thereof) for which the machine learning model 210 has encoding, and the probability for the single word at issue is based on the probability of that word appearing at the position it assumes in the multiword text string 202 (e.g., relative to preceding words in the multiword text string 202). For example, the probability generator 214 determines the probabilities of one or more (e.g., all) of the words available to the machine learning model 210 and sums the probabilities to determine a total unnormalized probability total, and the probability generator 214 then divides the individual unnormalized word probability of the word in the multiword text string 202 by that unnormalized probability total to determine a normalized probability that the word appears in the multiword text string 202.

The machine learning model 210 may provide the output probability data from the probability generator 214 as input to a perplexity generator 216. The perplexity generator 216 is executable by the processor 208 and operable to generate a perplexity score for the multiword text string 202 based on the input probability data generated by the probability generator.

The perplexity generator 216 may use any perplexity inferential model to determine the aggregate perplexity score 218 for the multiword text string 202. In an implementation, the perplexity generator 216 generates an aggregate perplexity score 218 based on an inferential relationship between an aggregate perplexity score 218 and one or more of semantic probabilities of words in the multiword text string 202 and a number of the words in the multiword text string 202. In an implementation, the aggregate perplexity score 218 is determined by determining an Nth root of an inverse multiplication of the individual probabilities of the word string, where N represents the number of words (e.g., including or excluding punctuation) in the multiword text string 202. For example, the perplexity score generator may output an aggregate perplexity score of a multiword text string 202 based on equation (1) (e.g., the output of equation (1) may be or can be used to determine the aggregate perplexity score 218).

$$PP(W) = \sqrt[N]{\prod_i \frac{1}{P(w_i)}} \tag{1}$$

In equation 1, W (capital W) represents the multiword text string 202 (and/or encoding thereof), PP(W) is a perplexity (e.g., an aggregate perplexity score 218 or an element used to calculate the aggregate perplexity score 218) of the multiword text string 202, N is the number of words (e.g., including or excluding a punctuation mark), i is an index marker indicating a position of a word in the multiword text string 202, and $P(w_i)$ is a probability that the $i^{th}$ word in the multiword text string 202 is semantically related to other words in the sequence. In an implementation, the probability of an $i^{th}$ word $P(w_i)$ is generated based on words that precede the $i^{th}$ word in the multiword text string 202. For example, the probability of an $i^{th}$ word $P(w_i)$ is a conditional probability based on the preceding words in the multiword text string 202, as demonstrated by equation (2).

$$P(w_i) = P(w_i | w_1 \ldots w_{i-1}) \tag{2}$$

In implementations, the perplexity generator 216 post-processes the aggregate perplexity score 218 to increase the resolution of the output aggregate perplexity score 218 relative to other perplexity scores. For example, the perplexity generator 216 may introduce nonlinearity to the output aggregate perplexity score 218. Nonlinearities introduced can include one or more of taking a root (e.g., square root, third root, etc.) of the aggregate perplexity score 218, raising the aggregate perplexity score 218 to a power, using the aggregate perplexity score 218 as an exponent (e.g., of a number such as Euler's number), and taking a log of the perplexity score 218.

The aggregate perplexity score 218 generated for the multiword text string 202 is outputted from the machine learning model 210 and introduced to a coherence classifier 220. The coherence classifier 220 is executable by the processor 208 and operable to classify a coherence of the multiword text string 202 based on the aggregate perplexity score 218.

In an implementation, the coherence classifier 220 determines the coherence of the multiword text string based on whether the aggregate perplexity score 218 satisfies a coherence condition. In an implementation, the coherence condition includes a coherence score. In implementations, the coherence score includes a threshold value or range of values of the aggregate perplexity score 218. For example, the coherence score may be a minimum perplexity score used for filtering out multiword text strings 202 with lower perplexity scores than the coherence score. In an implementation, the coherence condition may include a range of moderate coherence wherein the coherence score includes a range of aggregate perplexity scores that represents that a multiword text string is of moderate coherence. For example, if the statements are moderately coherent by this standard, the coherence classifier 220 may transmit an instruction that indicates that the multiword text string 202 may benefit from editing by a user before inclusion in a summary. In other implementations, the coherence score is based on a ranking of relative perplexity scores (e.g., a threshold value of or a range of values of one or more of a rank, a relative rank, a percentile rank, and a normalized relative perplexity).

Although illustrated as an element stored on the storage media device 206, implementations are contemplated in which the machine learning model 210 and the coherence classifier 220 are stored in different storage media devices and/or executable by the same or different processors, and the aggregate perplexity score 218 is introducible to the coherence classifier by an output interface (not illustrated) between the machine learning model 210 and the coherence classifier 220.

The coherence classifications may include instructions to include or exclude the multiword text string 202 for display in a user interface 224 via an output interface 222. In an implementation, the output interface 222 may communicatively couple one or more of the processor 208, storage media device 206, and a computing device and/or a display for presenting the user interface 224 to a user.

The user interface 224 may display one or more of the multiword text string 202 and a selectable item representative thereof (e.g., generated by the coherence classifier 220 or a separate selectable item generator (not illustrated) executable by the processor and operable to generate the selectable item).

In implementations, the user interface 224 includes a first portion and a second portion. The second portion may display candidate multiword text strings 202 and/or candidate selectable item associated therewith with an option to select the candidate multiword text strings 202 and/or candidate selectable item associated therewith for inclusion in a summary. In an implementation, a user selects the candidate multiword text strings 202 and/or candidate selectable item associated therewith, and the selected candidate multiword text strings 202 are displayed in a second portion of the user interface 224. In an implementation, the second portion is displayed concurrently with the first portion (e.g., in a window or in concurrently viewable windows). In an implementation, the selection of the candidate multiword text strings 202 and/or candidate selectable item associated therewith causes the user interface 224 to remove the candidate multiword text strings 202 and/or candidate selectable item associated therewith from display in the first portion.

Figure 3:
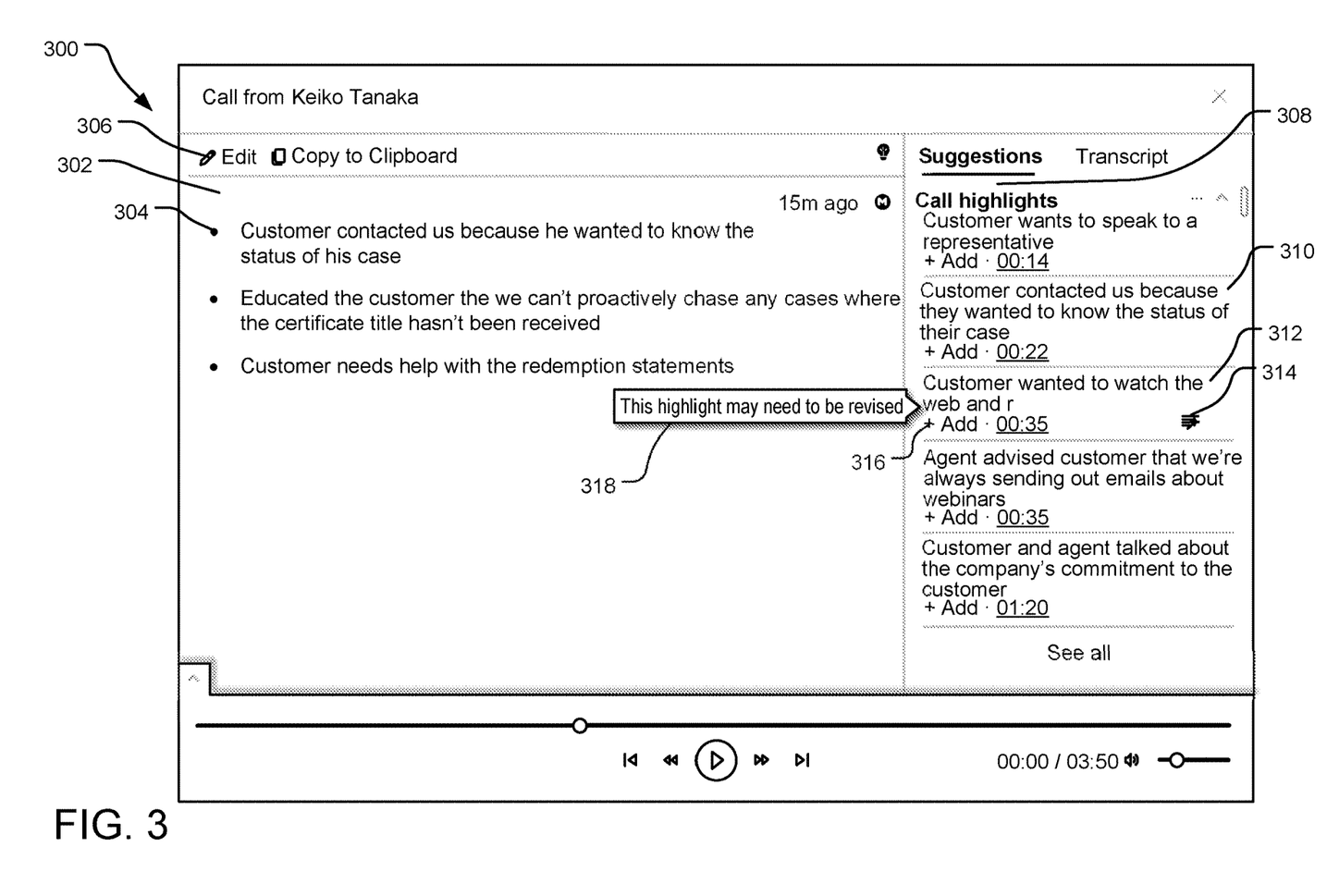
FIG. 3 illustrates an example user interface.

FIG. 3 illustrates an example user interface 300. In an implementation, the user interface 300 is operable by a user to generate a summary by receiving a selection (e.g., a user selection) of one or more candidate multiword text strings and/or one or more candidate selectable items associated therewith.

In the illustrated example, the user interface 300 includes a first portion 308 and a second portion 302. The user interface 300 displays candidate multiword text strings 310 and 312 and/or candidate selectable item associated therewith in the first portion 308. As illustrated, a first candidate multiword text string 310 has been selected for inclusion as a summary highlight in the summary displayed in the second portion 302 in the user interface 300, displayed as summary highlight 304. The second portion 302 includes an editing option 306 for editing selected highlights.

A second candidate multiword text string 312 is displayed in the first portion 308. The second candidate multiword text string 312 is selectable for inclusion in the second portion 302 by selection (e.g., by a user) of a string selector 316. In the illustrated implementation, the second candidate multiword text string 312 has been flagged as moderately coherent (e.g., it has a perplexity score that falls within a coherence score range representative of modest coherence). In the illustrated example, the second candidate multiword text string 312 includes the text "web and r," which is likely a misrepresentation of "webinar." The user interface 300 includes a suggestion indicator 318 of a suggestion to edit the second candidate multiword text string 312 to improve the coherence of the second candidate multiword text string 312. The user interface 300 further displays a selectable edit option 314 to allow editing (e.g., by a user) of the second candidate multiword text string 312 in the first portion 308 before the second candidate multiword text string 312 is selected by selecting (e.g., by a user) the string selector 316 for inclusion in the second portion 302 as a summary highlight element. In implementations in which the multiword text strings represent summaries of a multiuser conversation transcript, the summary generators that generate the multiword text strings may remove gender from the multiword text strings, and the selection of the multiword text strings may cause the user interface 300 to display corresponding summary highlights with the specified gender. For example, the first candidate multiword text string 310 uses the gender-neutral pronouns "they" and "their," and the corresponding summary highlight 304 specifies that the customer identifies as male, utilizing the corresponding pronouns "him" and "his."

Figure 4:
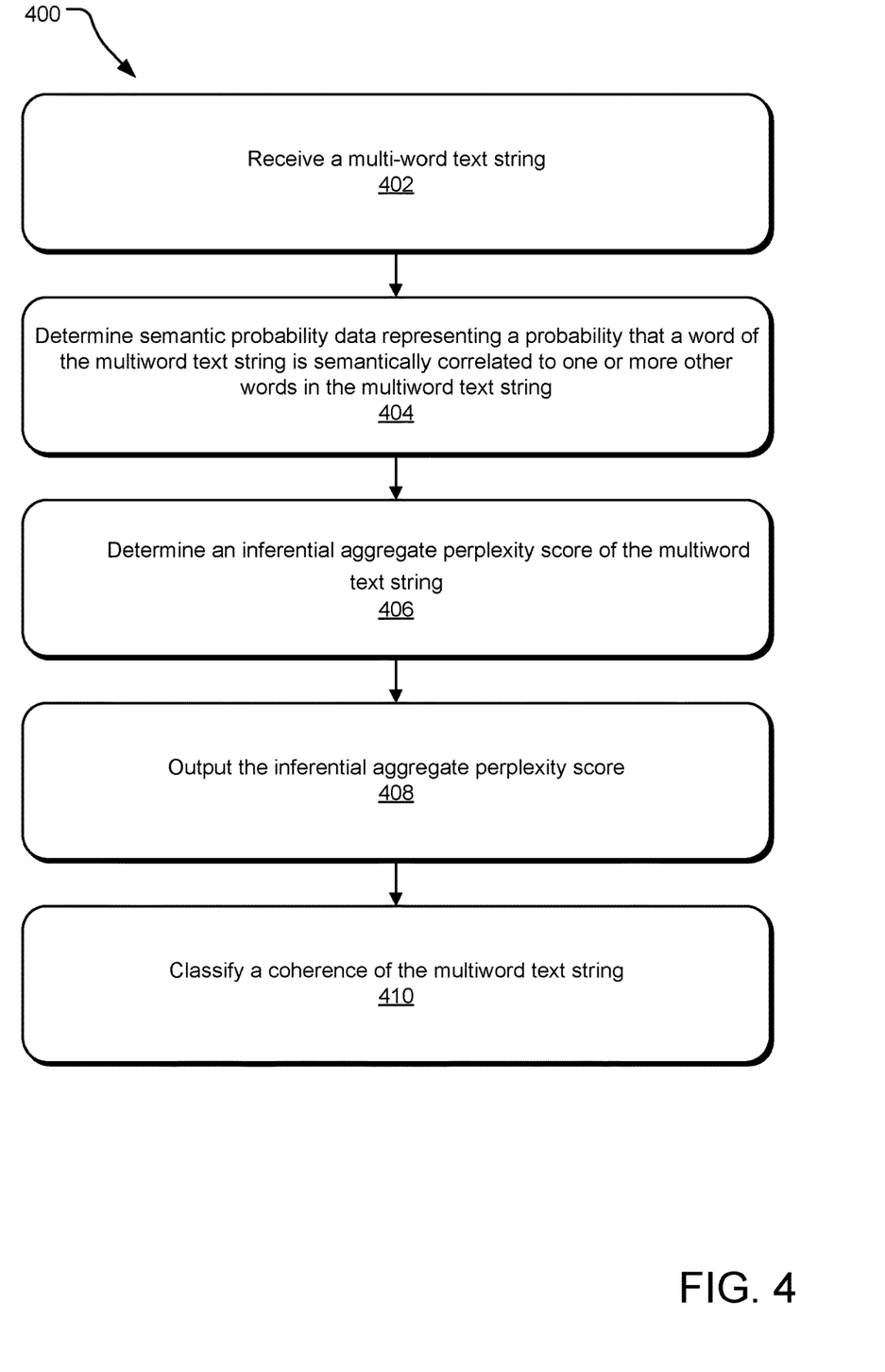
FIG. 4 illustrates example operations for classifying the coherence of a multiword text string.

FIG. 4 illustrates example operations 400 for classifying the coherence of a multiword text string. A receiving operation 402 receives a multiword text string. In implementations, the multiword text string includes text semantically representing a portion of a transcript of a conversation. A system (e.g., an operating system and/or summary generator) inputs the multiword text string into the machine learning model (e.g., via an input interface).

In implementations, the machine learning model includes a text transformer. The text transformer is executable by a processor and operable to transform the text of the multiword text string to be digestible by the elements of the machine learning model. For example, the text transformer may be operable to tokenize or otherwise encode the multiword text string. The text transformer may output the encoded representation of the multiword text string.

A determining operation 404 determines semantic probability data representing a probability that a word of a multiword text string is semantically correlated with one or more other words in the multiword text string. The machine learning model may provide the encoded representation multiword text string as an input to a probability generator of the machine learning model. The probability generator is executable by the processor and is operable to generate semantic probability data representing a probability that a word (represented as an encoding) of the multiword text string is semantically correlated to one or more other words in the multiword text string. For example, the probability data for each word could include a probability that a word would be the next word in a string based on preceding words in the multiword text string. The output of the probability generator may include semantic probability data representing one or more semantic probabilities of words in the multiword text string. In an implementation, the probability generator generates semantic probability data for each of the words in the multiword text string and may additionally or alternatively include probability data representing a probability of a punctuation mark in the encoding of the multiword text string.

In implementations, probability generator normalizes the probability data for each word relative to other words identified in the lexicon of the machine learning model. For example, the probability may determine the probabilities of many words based on other words in the multiword text string. In implementations, the probability generator calculates probabilities are calculated for all words (or tokenized or encoded versions thereof) for which the machine learning model has encoding, and the probability for the single word at issue is based on the probability of that word appearing at the position it assumes in the multiword text string (e.g., relative to preceding words in the multiword text string). For example, the probability generator determines the probabilities of one or more (e.g., all) of the words available to the machine learning model and sums the probabilities to determine a total unnormalized probability total, and the probability generator then divides the individual unnormalized word probability of the word in the multiword text string by that unnormalized probability total to determine a normalized probability that the word appears in the multiword text string.

A determining operation 406 determines an inferential aggregate perplexity score of the multiword text string. The machine learning model may provide the output probability data from the probability generator as input to a perplexity generator. The perplexity generator is executable by the processor and operable to generate a perplexity score for the multiword text string based on the input probability data generated by the probability generator.

The perplexity generator may use any perplexity inferential model to determine the aggregate perplexity score for the multiword text string. In an implementation, the perplexity generator generates an aggregate perplexity score based on an inferential relationship between an aggregate perplexity score and one or more of semantic probabilities of words in the multiword text string and a number of the words in the multiword text string. In an implementation, the aggregate perplexity score is determined by determining an Nth root of an inverse multiplication of the individual probabilities of the word string, where N represents the number of words (e.g., including or excluding punctuation) in the multiword text string. For example, the perplexity score generator may output an aggregate perplexity score of a multiword text string based on equation (1) (e.g., the output of equation (1) may be or can be used to determine the aggregate perplexity score). In an implementation, the probability of an $i^{th}$ word $P(w_i)$ is generated based on words that precede the $i^{th}$ word in the multiword text string. For example, the probability of an $i^{th}$ word is a conditional probability based on the preceding words in the multiword text string, as demonstrated by equation (2).

In implementations, the machine learning model post-processes the aggregate perplexity score to increase the resolution of the aggregate perplexity score relative to other perplexity scores. For example, the perplexity score generator may introduce a nonlinearity to the aggregate perplexity score before outputting the aggregate perplexity score. Nonlinearities introduced can include one or more of taking a route (e.g., square root, third root, etc.) of the aggregate perplexity score, raising the aggregate perplexity score to a power, using the aggregate perplexity score as an exponent (e.g., of a number such as Euler's number), and taking a log of the aggregate perplexity score to yield the output aggregate perplexity score.

An outputting operation 408 outputs the inferential aggregate perplexity score. The aggregate perplexity score generated for the multiword text string is outputted from the machine learning model for introduction as input to a coherence classifier.

A classifying operation 410 classifies the coherence of the multiword text string. The coherence classifier is executable by the processor and operable to classify a coherence of the multiword text string based on the aggregate perplexity score.

In an implementation, the coherence classifier determines the coherence of the multiword text string based on whether the aggregate perplexity score satisfies a coherence condition. In an implementation, the coherence condition includes a coherence score. In implementations, the coherence score includes a threshold value or range of values of the aggregate perplexity score. For example, the coherence score may be a minimum perplexity score used for filtering out multiword text strings with lower perplexity scores than the coherence score. In an implementation, the coherence condition may include a range of moderate coherence wherein the coherence score includes a range of aggregate perplexity scores that represent a multiword text string is one of moderate coherence. For example, if the statements are moderately coherent by this standard, the coherence classifier may transmit an instruction that indicates that the multiword text string may benefit from editing by a user before inclusion in a summary. In other implementations, the coherence score is based on a ranking of relative perplexity scores (e.g., a threshold value of or a range of values of one or more of a rank, a relative rank, a percentile rank, and a normalized relative perplexity).

Implementations are contemplated in which the machine learning model and the coherence classifier are stored in different storage media devices and/or executable by the same or different processors, and the aggregate perplexity score is introducible to the coherence classifier by an output interface between the machine learning model and the coherence classifier.

The coherence classifications may include instructions to include or exclude the multiword text string for display in a user interface via an output interface. In an implementation, an output interface may communicatively couple one or more of the processor, storage media device, and a computing device and/or a display for presenting the user interface to a user.

The user interface may display one or more of the multiword text string and a selectable item representative thereof (e.g., generated by the coherence classifier or a separate selectable item generator executable by the processor and operable to generate the selectable item).

In implementations, the user interface includes a first portion and a second portion. The second portion may display candidate multiword text strings and/or candidate selectable item associated therewith with an option to select the candidate multiword text strings and/or candidate selectable item associated therewith for inclusion in a summary. In an implementation, a user selects the candidate multiword text strings and/or candidate selectable item associated therewith, and the selected candidate multiword text strings are displayed in a second portion of the user interface. In an implementation, the second portion is displayed concurrently with the first portion (e.g., in a window or in concurrently viewable windows). In an implementation, the selection of the candidate multiword text strings and/or candidate selectable item associated therewith causes the user interface to remove the candidate multiword text strings and/or candidate selectable item associated therewith from display in the first portion.

In an implementation, a candidate multiword text string is displayed in the first portion (e.g., as a selectable item). In an implementation, the user interface receives a selection (e.g., a user selection) of the candidate multiword text string for inclusion in the second portion by a selection of a string selector. In an implementation, the candidate multiword text string has been flagged as moderately coherent (e.g., it has a perplexity score that falls within a coherence score range representative of modest coherence). In an implementation, the user interface includes an indication of a suggestion to edit the second candidate multiword text string to improve the coherence of the second candidate multiword text string. In implementations, the user interface further displays a selectable edit option to allow editing (e.g., by a user) of the second candidate multiword text string in the first portion before the second candidate multiword text string is selected by the string selector for inclusion in the second portion as a summary highlight element. In implementations in which the multiword text strings represent summaries of a multiuser conversation transcript, the summary generators that generate the multiword text strings may remove gender from the multiword text strings, and the selection of the multiword text strings may cause the user interface to display corresponding summary highlights with the specified gender. For example, the multiword text string uses the gender-neutral pronouns "they" and "their," and the corresponding summary highlight specifies that the customer identifies as male, utilizing the corresponding pronouns "him" and "his."

In implementations, the machine learning model may be a trained machine learning model trained by a machine learning model trainer introducing training text strings semantically representing the text of a recorded conversation. The machine learning model may then output a training aggregate perplexity score for each training text string. The machine learning model trainer may then compare the training aggregate perplexity score with a predefined aggregate perplexity score to determine a loss. The machine learning model trainer may then backpropagate the determined loss through the machine learning model.

Figure 5:
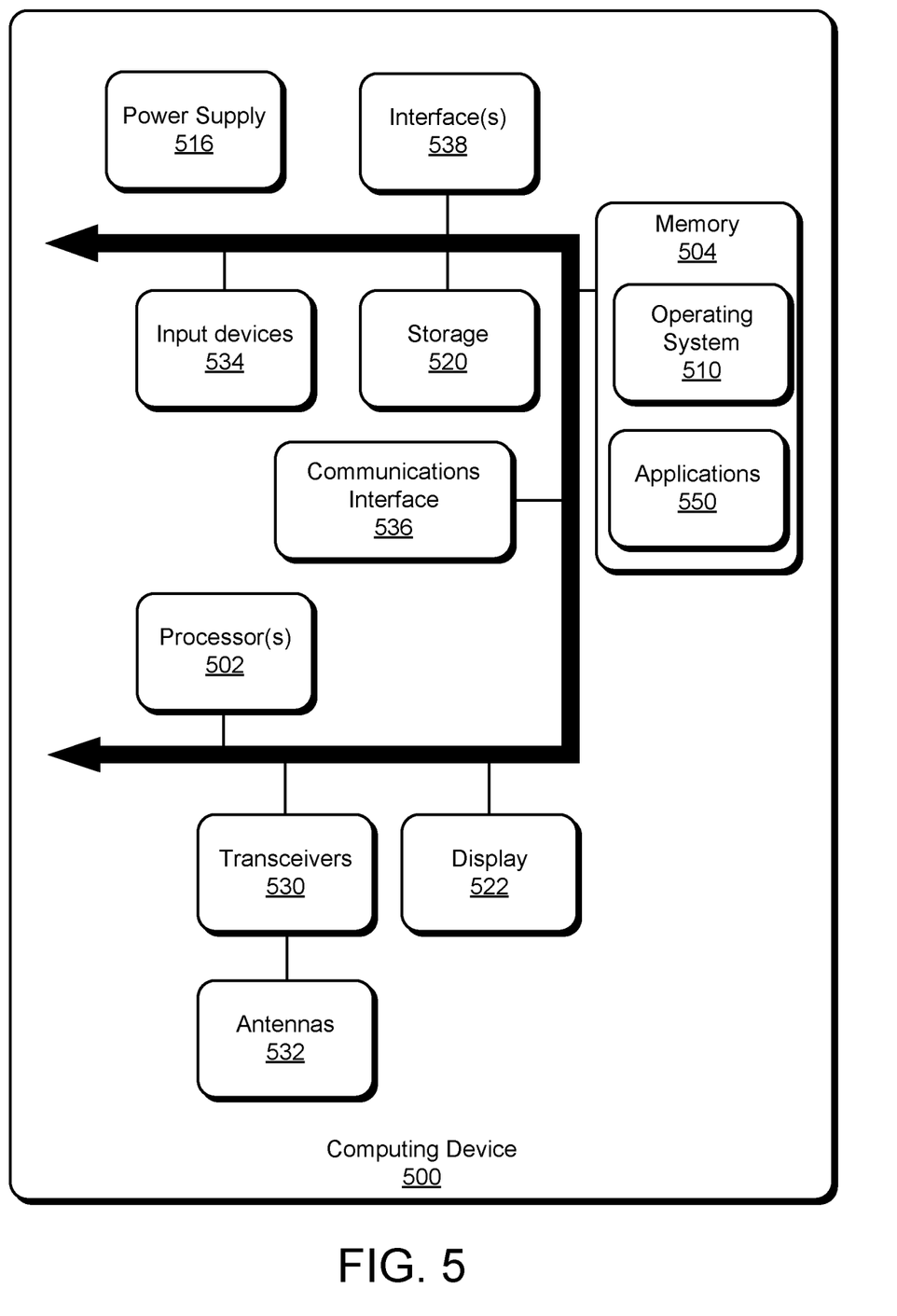
FIG. 5 illustrates an example computing device for implementing the features and operations of the described technology.

FIG. 5 illustrates an example computing device 500 for implementing the features and operations of the described technology. The computing device 500 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 500 includes one or more processor(s) 502 and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550, a summary generator, a coherence classifier, a machine learning model, a text transformer, a probability generator, a perplexity generator, a coherence classifier, a string selector, and a suggestion indicator are loaded into the operating system 510 on the memory 504 and/or storage 520 and executed by processor(s) 502. The storage 520 may include one or more tangible storage media devices and may store one or more of a multiword text string, a summary highlight, a user interface (e.g., with one or more of a first portion and a second portion), a suggestion to edit a multiword text string, a summary highlight, a transcript, an inferential probability of a word in a multiword text string, an inferential perplexity score, a coherence classification, a coherence score, a training multiword text string, a training probability of a word in a multiword text string, a predefined training aggregate perplexity score, and a ranking of relative perplexities of multiword text strings, locally and globally unique identifiers, requests, responses, and other data and be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (e.g., a network adapter), which is a type of computing device. The computing device 500 may use the communications interface 536 and any other types of computing devices for establishing connections over a wide-area network (WAN) or local-area network (LAN). It should be appreciated that the network connections shown are examples and that other computing devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method for classifying coherence of a multiword text string is provided. The method includes receiving the multiword text string into a machine learning model, determining, by the machine learning model, semantic probability data representing a probability that a word of the received multiword text string is semantically correlated to one or more other words in the multiword text string, determining, by the machine learning model, an inferential aggregate perplexity score of the multiword text string, based on the determined semantic probability data, outputting, from the machine learning model, the inferential aggregate perplexity score, and classifying a coherence of the multiword text string based on whether the outputted inferential aggregate perplexity score satisfies a coherence condition, wherein the coherence condition is based on a predefined coherence score.

Another example method of any preceding method is provided, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

Another example method of any preceding method is provided, the method further including generating, by a summarizing machine learning model, the multiword text string based on a transcript of a communication between at least two entities, wherein the multiword text string is a semantic representation of the transcript different from the transcript.

Another example method of any preceding method is provided, the method further including determining whether to transmit an instruction to display the multiword text string in a user interface based on the classified coherence.

Another example method of any preceding method is provided the method further including transmitting an instruction operable to display a suggestion in a user interface that the multiword text string is classified to be manually edited based on the classified coherence.

Another example method of any preceding method is provided, wherein the operation of classifying the coherence includes one or more of ranking the multiword text string relative to other computer-generated multiword text strings and filtering of the multiword text string relative to other multiword text strings.

Another example method of any preceding method is provided, the method further including outputting a selectable item representing the multiword text string, the selectable item operable to be displayed in a first portion of a user interface and operable upon selection to be displayed in a second portion of the user interface.

An example computing system is provided. The computing system includes one or more hardware processors, a machine learning model executable by the one or more hardware processors and configured to receive a multiword text string, to determine semantic probability data representing a probability that a word of the received multiword text string is semantically correlated to one or more other words in the multiword text string, to determine an inferential aggregate perplexity score of the multiword text string, based on the determined semantic probability data, and to output the inferential aggregate perplexity score, and a classifier executable by the one or more hardware processors and configured to classify a coherence of the multiword text string based on whether the outputted inferential aggregate perplexity score satisfies a coherence condition, wherein the coherence condition is based on a predefined coherence score.

Another example computing system of any preceding system is provided, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

Another example computing system of any preceding system is provided, the system further including a summarizing machine learning model executable by the one or more hardware processors to generate the multiword text string based on a transcript of a communication between at least two entities, wherein the multiword text string is a semantic representation of the transcript different from the transcript.

Another example computing system of any preceding system is provided, wherein the classifier is further configured to determine whether to transmit an instruction to display the multiword text string in a user interface based on the classified coherence.

Another example computing system of any preceding system is provided, wherein the classifier is further configured to transmit an instruction operable to display a suggestion in a user interface that the multiword text string is classified to be manually edited based on the classified coherence.

Another example computing system of any preceding system is provided, wherein the classifier is configured to classify the coherence at least by one or more of ranking the multiword text string relative to other computer-generated multiword text strings and filtering of the multiword text string relative to other multiword text strings.

Another example computing system of any preceding system is provided, wherein the classifier is further configured to output a selectable item representing the multiword text string, the selectable item operable to be displayed in a first portion of a user interface and operable upon selection to be displayed in a second portion of the user interface.

One or more example processor-readable storage media devices embodied with instructions executable on a system including at least one hardware processor a process of classifying coherence of a multiword text string are provided. The process includes receiving the multiword text string into a machine learning model, determining, by the machine learning model, semantic probability data representing a probability that a word of the received multiword text string is semantically correlated to one or more other words in the multiword text string, determining, by the machine learning model, an inferential aggregate perplexity score of the multiword text string, based on the determined semantic probability data, outputting, from the machine learning model, the inferential aggregate perplexity score, and classifying a coherence of the multiword text string based on whether the outputted inferential aggregate perplexity score satisfies a coherence condition, wherein the coherence condition is based on a predefined coherence score.

One or more other example processor-readable storage media device of any preceding device is provided, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

One or more other example processor-readable storage media device of any preceding device is provided, the process further including generating, by a summarizing machine learning model, the multiword text string based on a transcript of a communication between at least two entities, wherein the multiword text string is a semantic representation of the transcript different from the transcript.

One or more other example processor-readable storage media device of any preceding device is provided, the process further including determining whether to transmit an instruction to display the multiword text string in a user interface based on the classified coherence.

One or more other example processor-readable storage media device of any preceding device is provided, the process further including transmitting an instruction operable to display a suggestion in a user interface that the multiword text string is classified to be manually edited based on the classified coherence.

One or more other example processor-readable storage media device of any preceding device is provided, the process further including outputting a selectable item representing the multiword text string, the selectable item operable to be displayed in a first portion of a user interface and operable upon selection to be displayed in a second portion of the user interface.

An example system for classifying coherence of a multiword text string is provided. The system includes means for receiving the multiword text string into a machine learning model, means for determining, by the machine learning model, semantic probability data representing a probability that a word of the received multiword text string is semantically correlated to one or more other words in the multiword text string, means for determining, by the machine learning model, an inferential aggregate perplexity score of the multiword text string, based on the determined semantic probability data, means for outputting, from the machine learning model, the inferential aggregate perplexity score, and means for classifying a coherence of the multiword text string based on whether the outputted inferential aggregate perplexity score satisfies a coherence condition, wherein the coherence condition is based on a predefined coherence score.

Another example system of any preceding system is provided, wherein the machine learning model was trained prior to the determination of the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

Another example system of any preceding system is provided, the system further including means for generating, by a summarizing machine learning model, the multiword text string based on a transcript of a communication between at least two entities, wherein the multiword text string is a semantic representation of the transcript different from the transcript.

Another example system of any preceding system is provided, the system further including means for determining whether to transmit an instruction to display the multiword text string in a user interface based on the classified coherence.

Another example system of any preceding system is provided, the system further including transmitting an instruction operable to display a suggestion in a user interface that the multiword text string is classified to be manually edited based on the classified coherence.

Another example system of any preceding system is provided, wherein the means for classifying the coherence includes one or more of means for ranking the multiword text string relative to other computer-generated multiword text strings and means for filtering of the multiword text string relative to other multiword text strings.

Another example system of any preceding system is provided, the system further including means for outputting a selectable item representing the multiword text string, the selectable item operable to be displayed in a first portion of a user interface and operable upon selection to be displayed in a second portion of the user interface.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relative to the quantitative or qualitative feature described. For example, a term of relative degree applied to orthogonality suggests an angle may have a magnitude of variability relative to a right angle. When values are presented herein for particular features and/or a magnitude of variability, ranges above, ranges below, and ranges between the recited values are contemplated.

What is claimed is:

1. A method for classifying coherence of a multiword text string, comprising:
    transforming the multiword text string into an encoded representation of the multiword text string using a text transformer of a machine learning model, wherein the encoded representation of the multiword text string includes encodings of individual words in the multiword text string;
    determining semantic probability data of the multiword text string by inputting the encoded representation into a semantic probability generator, the semantic probability data representing a probability that an encoded word in the encoded representation of the multiword text string is semantically correlated to one or more other encoded words in the encoded representation of the multiword text string;
    determining, by the machine learning model, an inferential aggregate perplexity score of the multiword text string, based on the determined semantic probability data between the encoded words in the multiword text string;
    outputting, from the machine learning model, the inferential aggregate perplexity score; and
    classifying the coherence of the multiword text string based on whether the outputted inferential aggregate perplexity score satisfies a coherence condition, wherein the coherence condition is based on a predefined coherence score.

2. The method of claim 1, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

3. The method of claim 1, further comprising:
    generating, by a summarizing machine learning model, the multiword text string based on a transcript of a communication between at least two entities, wherein the multiword text string is a semantic representation of the transcript different from the transcript.

4. The method of claim 1, further comprising:
    determining whether to transmit an instruction to display the multiword text string in a user interface based on the classified coherence.

5. The method of claim 1, further comprising:
    transmitting an instruction operable to display a suggestion in a user interface that the multiword text string is classified to be manually edited based on the classified coherence.

6. The method of claim 1, wherein the operation of classifying the coherence includes one or more of ranking the multiword text string relative to other computer-generated multiword text strings and filtering of the multiword text string relative to other multiword text strings.

7. The method of claim 1, further comprising:
    outputting a selectable item representing the multiword text string, the selectable item operable to be displayed in a first portion of a user interface and operable upon selection to be displayed in a second portion of the user interface.

8. The method of claim 1, wherein the semantic probability data is determined responsive to transforming the multiword text string into the encoded representation.

9. A computing system, comprising:
one or more hardware processors;
a text transformer of a machine learning model executable by the one or more hardware processors and configured to transform a multiword text string into an encoded representation of the multiword text string, wherein the encoded representation of the multiword text string includes encodings of individual words in the multiword text string;
a semantic probability generator of the machine learning model executable by the one or more hardware processors and configured to determine semantic probability data of the multiword text string, the semantic probability data representing a probability that an encoded word in the encoded representation of the multiword text string is semantically correlated to one or more other encoded words in the encoded representation of the multiword text string;
a perplexity generator of the machine learning model executable by the one or more hardware processors and configured to determine an inferential aggregate perplexity score of the multiword text string, based on the determined semantic probability data between the encoded words in the multiword text string, and to output the inferential aggregate perplexity score; and
a classifier executable by the one or more hardware processors and configured to classify a coherence of the multiword text string based on whether the outputted inferential aggregate perplexity score satisfies a coherence condition, wherein the coherence condition is based on a predefined coherence score.

10. The computing system of claim 9, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

11. The computing system of claim 9, further including:
a summarizing machine learning model executable by the one or more hardware processors to generate the multiword text string based on a transcript of a communication between at least two entities, wherein the multiword text string is a semantic representation of the transcript different from the transcript.

12. The computing system of claim 9, the classifier further configured to:
determine whether to transmit an instruction to display the multiword text string in a user interface based on the classified coherence.

13. The computing system of claim 9, the classifier further configured to:
transmit an instruction operable to display a suggestion in a user interface that the multiword text string is classified to be manually edited based on the classified coherence.

14. The computing system of claim 9, wherein the classifier is configured to classify the coherence at least by one or more of ranking the multiword text string relative to other computer-generated multiword text strings and filtering of the multiword text string relative to other multiword text strings.

15. The computing system of claim 9, the classifier further configured to:
output a selectable item representing the multiword text string, the selectable item operable to be displayed in a first portion of a user interface and operable upon selection to be displayed in a second portion of the user interface.

16. One or more processor-readable storage media devices embodied with instructions executable on a system including at least one hardware processor a process of classifying a coherence of a multiword text string, the process comprising:
receiving the multiword text string into a machine learning model;
transforming the multiword text string into an encoded representation of the multiword text string using a text transformer of the machine learning model, wherein the encoded representation of the multiword text string includes encodings of individual words in the multiword text string;
determining, by the machine learning model, semantic probability data representing a probability that an encoded word in the encoded representation of the multiword text string is semantically correlated to one or more other encoded words in the encoded representation of the multiword text string;
determining, by the machine learning model, an inferential aggregate perplexity score of the multiword text string, based on the determined semantic probability data between the encoded words of the multiword text string;
outputting, from the machine learning model, the inferential aggregate perplexity score; and
classifying the coherence of the multiword text string based on whether the outputted inferential aggregate perplexity score satisfies a coherence condition, wherein the coherence condition is based on a predefined coherence score.

17. The one or more processor-readable storage media devices of claim 16, wherein the machine learning model was trained prior to determining the semantic probability data and the inferential aggregate perplexity score based on input of training text strings semantically representing text of a recorded conversation into the machine learning model, generation of a training aggregate perplexity score by the machine learning model, comparison of the training aggregate perplexity score with a predefined aggregate perplexity score to determine a loss, and backpropagation of the determined loss through the machine learning model.

18. The one or more processor-readable storage media devices of claim 16, the process further comprising:
generating, by a summarizing machine learning model, the multiword text string based on a transcript of a communication between at least two entities, wherein the multiword text string is a semantic representation of the transcript different from the transcript.

19. The one or more processor-readable storage media devices of claim 16, the process further comprising:
determining whether to transmit an instruction to display the multiword text string in a user interface based on the classified coherence.

20. The one or more processor-readable storage media devices of claim 16, the process further comprising:

transmitting an instruction operable to display a suggestion in a user interface that the multiword text string is classified to be manually edited based on the classified coherence.

21. The one or more processor-readable storage media devices of claim 16, the process further comprising:
outputting a selectable item representing the multiword text string, the selectable item operable to be displayed in a first portion of a user interface and operable upon selection to be displayed in a second portion of the user interface.

* * * * *